June 10, 1958  J. J. HAGOPIAN ET AL  2,838,255
AUTOMATIC EMERGENCY RADIO CONTROL SYSTEM
Original Filed Aug. 18, 1950  7 Sheets-Sheet 1

INVENTORS:
Jacob J. Hagopian
Stuart R. Hennies

BY
THEIR PATENT ATTORNEY

June 10, 1958  J. J. HAGOPIAN ET AL  2,838,255
AUTOMATIC EMERGENCY RADIO CONTROL SYSTEM
Original Filed Aug. 18, 1950  7 Sheets-Sheet 2

Fig. 3

INVENTORS:
Jacob J. Hagopian
Stuart R. Hennies

BY Herbert E. Metcalf
THEIR PATENT ATTORNEY

United States Patent Office 2,838,255
Patented June 10, 1958

2,838,255

AUTOMATIC EMERGENCY RADIO CONTROL SYSTEM

Jacob J. Hagopian, San Jose, and Stuart R. Hennies, Los Altos, Calif., assignors to Northrop Aircraft, Inc., Hawthorne, Calif., a corporation of California Original application August 18, 1950, Serial No. 180,367. Divided and this application May 1, 1953, Serial No. 352,334

4 Claims. (Cl. 244—14)

This application is a division of our prior application Serial Number 180,367, filed August 18, 1950, now Patent No. 2,769,601, issued November 6, 1956, and entitled "Automatic Radio Control System."

The present invention relates to remote control systems, and more particularly to emergency operating means in the receiver end of a remote radio control system for a moving vehicle.

Various remote aircraft control systems at present use a radio link wherein a transmitted radio wave having predetermined modulation frequencies is received by the aircraft, in which are installed various electrical circuits respectively controlled by selector means which are tuned to the respective modulation frequencies. Functions which may be controlled and operated in the remote airplane by this means are the various flight attitude operations, lowering and raising of landing gear, turning on and off of automatic altitude control, and so forth.

If the controlled craft is completely free except for this radio link, it will remain under control only so long as the carrier wave does not fail or fall below a certain received intensity, or the receiving equipment itself does not fail. The danger of a malfunction or of the aircraft getting out of radio range is increased when high speed aircraft or guided missiles are being tested.

Accordingly, it is an object of the present invention to provide means for automatically operating emergency control functions in the moving vehicle in the event of loss of the remote control signal power.

Such craft as mentioned above, for example, is initially put into operation by a launching procedure which may or may not require the use of moving launching devices. In order to maintain maximum safety, a further object of our invention is to provide accurate means for achieving remote aircraft control from the instant of launching through final landing operations.

Other objects and features of advantage will be noted in the detailed description of specific apparatus to follow, but this invention is not deemed to be limited to the specific apparatus disclosed herein, since various forms or modifications may be adopted.

Briefly, our invention comprises a pulse-operated radio control link system including a plurality of coded signal channels, one or more of which is connected to operate transfer means for switching the outputs of the remaining channels from one set of respective functional control circuits to an additional set. This duplexing means is accompanied by suitable time delays for automatic energizing and de-energizing of relay circuits so that after a certain remote control member is moved to require operation of the transfer means, the signal pulse in the proper channel is sent and then the transfer means is reset to a steady state position to allow proper operation of other remote control members not requiring use of the transfer means. In this manner, for example, a total of $2(x-1)$ control circuits can be selectively energized by the use of $x$ control channels when one of those channels operates to provide duplexing of the remainder. The pulse signals received in the controlled craft are converted, by suitable relays, into various completed electrical circuits conventionally designed to produce the desired operation.

In the event of failure of the transmitted carrier wave to maintain a predetermined level at the controlled craft, or a failure in the receiver, an emergency relay is caused to substitute certain fixed control circuits therein in place of the normal remote control circuits, provisions being made for precluding operation of this emergency relay until sufficient time has elapsed after launching for the craft to reach a safe altitude. Additional automatically resettable delay means is provided so that momentary fade-out of the transmitted signals will not activate the emergency control circuits until the time delay has been exceeded, and so that after this, the return to normal remote control will be made if the transmitted signal power is restored. Remote control member locking means is preferably provided to lock certain of these members against movement by the operator when a transmitting circuit normally operated by a member is temporarily disrupted by the aforementioned transfer means. Connecting the transfer means to automatically transmit a transfer signal substantially simultaneously with a pulse signal in a normal channel, when required, results in requiring only one control member for any desired function.

Our invention will be more clearly understood by reference to the accompanying drawings of a preferred embodiment thereof, in which.

Figure 1:
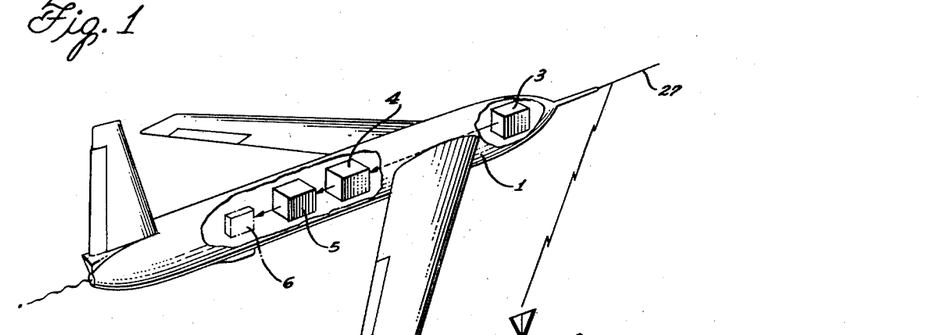
Figure 1 is a perspective view of an aircraft under control from a remote ground station, showing in block form the transmitting and airborne equipment of the present invention.

Referring first to Figure 1 for an overall description of this system, an aircraft 1 is operated by a control system comprising a transmitting station 2, on the ground or in another aircraft, and airborne equipment including a receiver and selector unit 3, receiver output adapter 4, and control unit 5, and all actuated equipment controlled thereby is represented by the dotted box 6. This actuated equipment, for the specific apparatus disclosed herein, include pitch control surfaces, bank control surfaces, throttle, automatic altitude system, automatic heading system, landing gear, landing flap surfaces, and a smoke signal apparatus. These functions will be described later insofar as they have a bearing on the present invention.

Figure 2:
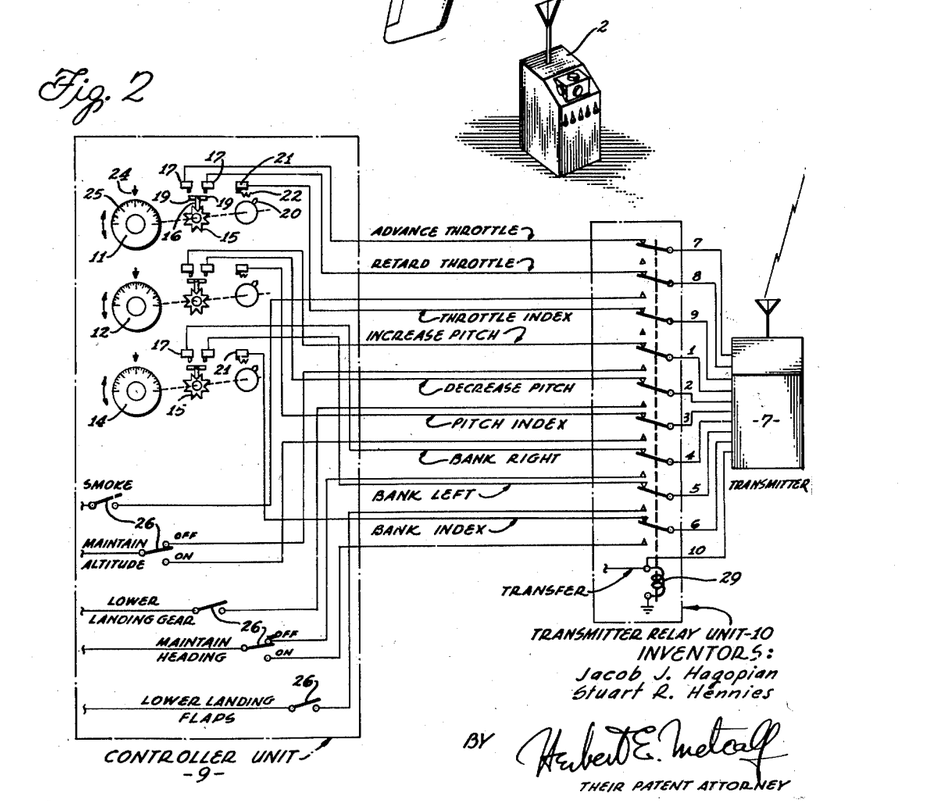
Figure 2 is a schematic diagram, partly in block form, showing the general outline of the transmitting station equipment used in the system of Figure 1.

At the transmitting station 2, as shown in Figure 2, is located a transmitter 7, a transmitter controller unit 9, and a transmitter relay unit 10. The controller unit 9 contains a manually operated throttle control knob 11, pitch control knob 12, and bank control knob 14. Attached to be rotated by each respective control knob is a star wheel 15 arranged to deflect a switch toggle 16 in one of two directions and then let the toggle return to neutral when the star wheel is rotated one notch in one direction. Opposite toggle deflection results from opposite star wheel rotation, and two spring-loaded control switches 17 are mounted to be respectively actuated on and off by heels 19 of the toggle 16 during deflection thereof.

In addition to the star wheel 15, an actuator finger 20 is directly turned by each control knob, and a synchronizing switch 21, having a double headed actuating plunger 22, is located in position to be contacted by the finger 20. At a neutral reference position of its associated control knob, the finger 20 rests in the center of the actuating plunger 22 so that the synchronizing switch 21 is non-actuated. This neutral reference position is referred to as the index position, and it is seen that whenever the throttle knob 11, pitch knob 12, or bank knob 14 is turned from either side position into its index position, its respective synchronizing switch 21 will be actuated through one cycle.

The three manual controls 11, 12 and 14 are each preferably provided with position indicating means such as a pointer 24 and a calibrated dial 25, and the transmission ratio between the knob and the star wheel 15 is such that a rotation of one calibration mark causes a displacement of one notch of the star wheel. Thus, for each one-point movement of the throttle knob 11, for example, one of the control switches 17 is actuated on and off to produce one "pulse," and, in addition, whenever the index position is reached, a separate "pulse" will be produced by the synchronizing switch 21. These control units are shown, described and claimed in a separate copending application of Hagopian and Meadowcroft, Serial No. 152,042, filed March 27, 1950, now Patent No. 2,774,864, issued December 18, 1956.

In addition to the main control knobs, a row of five auxiliary function switches 26 (on-off type) is provided on the controller unit 9. These manually operated switches control the auxiliary and emergency functions listed above.

Each control switch 17, synchronizing switch 21, and auxiliary function switch 26 is connected through the transmitter relay unit 10 (to be described in detail later) into a modulation circuit in the transmitter 7. In this example, ten different audio oscillators (not shown) are provided in the transmitter 7, together with the necessary relays and other conventional equipment, each oscillator being operatively connected into the transmitting circuit when its corresponding energizing means is actuated, as is well known to those skilled in the art. In other words, a control tone is transmitted for the short period of time taken in turning from one calibrated control knob position to the next position, or in throwing one of the auxiliary function switches 26, and the frequency of the tone depends upon which particular switch is operated.

Numbers on the output side of the relay unit 10 refer to these ten channels and show which channel is used for the various controls. In a preferred embodiment of this invention, the frequencies of the ten audio channels were selected as follows: 300, 420, 590, 825, 1155, 1620, 2270, 3180, 4450 and 6250 cycles per second, for channels 1 through 10 respectively.

The transmitting equipment as described may be located at a ground station, as shown in Figure 1, or be mounted in a "chase" car or airplane, or duplicated in several locations for alternate control. In the aircraft 1 or other device to be remotely controlled, the transmitted signal is picked up by a receiver antenna 27.

Figure 3:
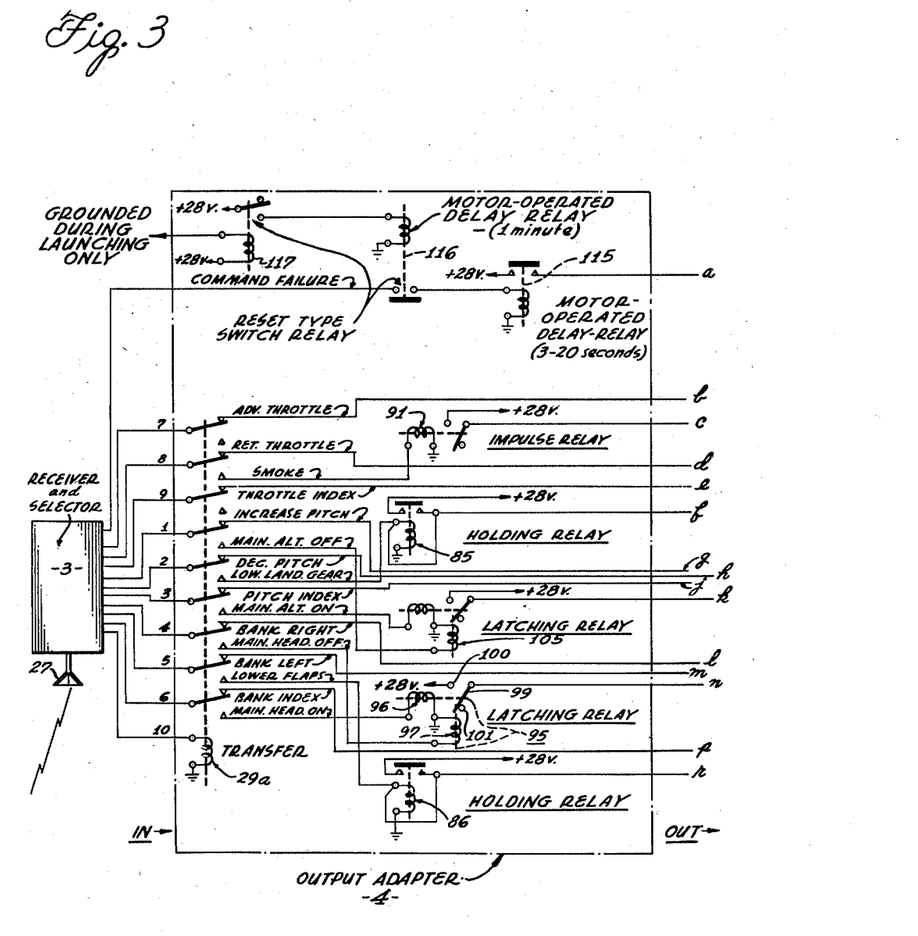
Figure 3 is a schematic diagram, partly in block form, showing the general outline of receiving and selecting equipment mounted in the radio controlled craft of Figure 1, this equipment taking signals directly from the apparatus in Figure 2.

In the receiver 3, the signals are demodulated and amplified in any conventional way and then fed to the selector which contains the customary selective filters (not shown) which pass or reject any particular audio tone according to its frequency. The filters are, of course, individually tuned to the same frequencies as the respective ten control oscillators, so that a 1620-cycle signal, for example, will be passed by the 1620-cycle filter only, thus giving ten output channels from the receiver and selector unit 3.

It will be noted that for each attitude control knob 11, 12 and 14, in Figure 2, there are three signal circuits, two of which govern movement of the respective functions in opposite directions, and the third giving a synchronizing signal at the index position only, as indicated by the labels on the respective output leads. These nine function circuits are connected through the normally closed contacts of one or more function transfer relays, represented at 29 in Figure 2, to thereby fill nine of the ten audio channels. Channel number 10 is a transfer channel which is energized for approximately one-half second whenever any one of the auxiliary function switches 26 is operated, as will be described in detail later, which operation also actuates the function transfer relays 29 to switch channels 1 through 9 to a second set of function circuits connected respectively to the auxiliary function switches 26. Thus, nine additional circuits are provided, operating through the normally open contacts of the function transfer relays 29, although only seven such additional circuits are actually shown in Figure 2, leaving two spares.

In Figure 3, the output of the filter from channel number 10 is connected to actuate a single transfer relay 29a in the receiver output adapter 4, to switch control circuit connections from the nine basic attitude control circuits to the auxiliary function circuits which are duplicates of the auxiliary switch circuits in Figure 2. The eighteen possible control circuits are thus present again in the aircraft in the output adapter 4, in Figure 3, as indicated by the correspondingly labelled wires.

Figure 4:
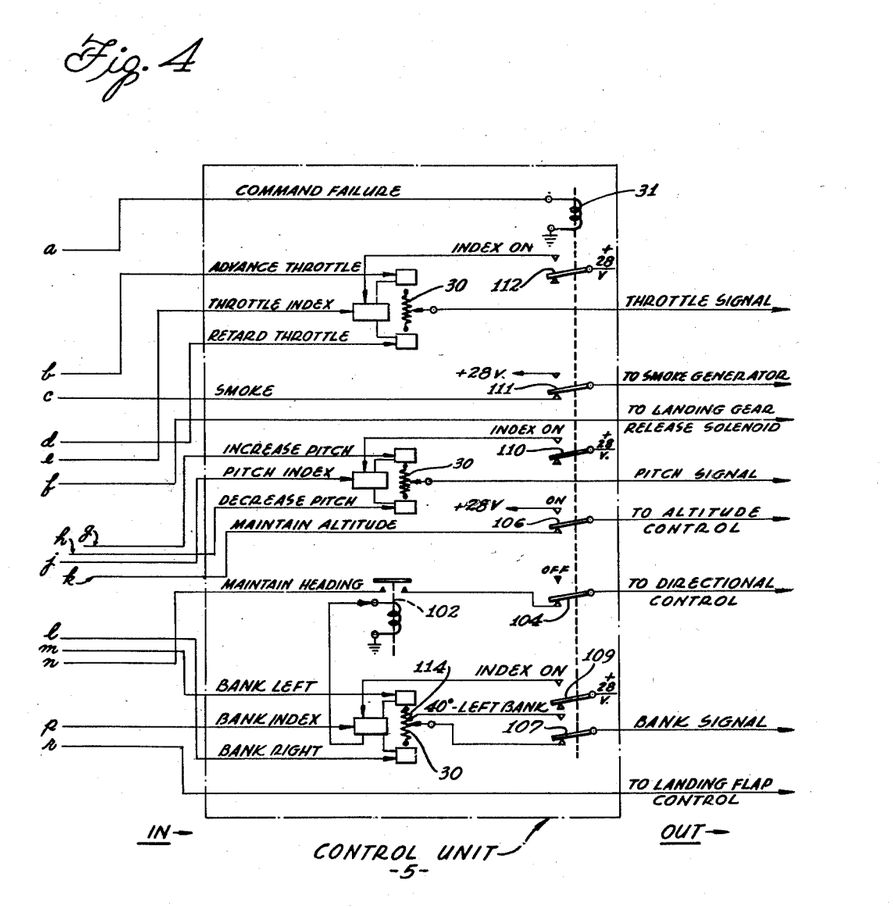
Figure 4 is a schematic diagram, partly in block form, showing a control unit directly connected to the apparatus in Figure 3 as indicated by correspondingly lettered output and input leads.

The three circuits from a single transmitter controller attitude knob pass through the output adapter 4 to control the position of one of three stepping potentiometers 30 in the control unit 5, as shown in Figure 4. These stepping potentiometers 30 are the controlling members of conventional autopilot and throttle servo mechanisms which in turn control the position of a throttle and pitch and bank control surfaces of the aircraft 1 in the usual manner.

Briefly, the operation of the stepping potentiometers is as follows: A control pulse in the "advance throttle" line b, for example, which is a 28-volt D. C. pulse, will actuate a dual stepping relay connected to drive the throttle potentiometer one increment in the advancing direction. Succeeding pulse signals in this same line will continue to "step" the potentiometer one increment for each pulse. Similarly, control pulses in the "retard throttle" line d will actuate the same stepping potentiometer one increment in the retarding direction. When the throttle control knob 11 is turned to the reference index position, an indexing pulse will be sent through the "throttle index" line e by reason of its synchronizing switch 21. In the control unit 5, the 28-volt indexing pulse will energize a pulsing relay and associated connecting relays (not shown), if the throttle stepping potentiometer is not already in its index position, to drive the stepping relay and potentiometer the number of increments necessary to bring them to index. Thus, the throttle servo mechanism, in which the stepping potentiometer is connected, is automatically synchronized with the controller knob whenever the index position is reached. This indexing system is fully shown, described and claimed in the application of Rhoades and Stevens, U. S. Serial No. 217,102, filed March 23, 1951, and now allowed but withheld from issue.

Control equipment for the auxiliary functions, i. e., the circuits controlled by the five auxiliary switches 26, is illustrated in the output adapter 4 of Figure 3. Here are various types of 28-volt relays which turn on and off the auxiliary or emergency equipment in accordance with the position of the relay contacts. These auxiliary function control circuits are extended through the control unit 5 of Figure 4 and then are routed to the proper actuators as indicated by the labels for each output lead. In the control unit 5, a command failure relay 31 acts upon loss of receiver output, to switch all output circuits to predetermined conditions as will be described in full later.

Figure 5:
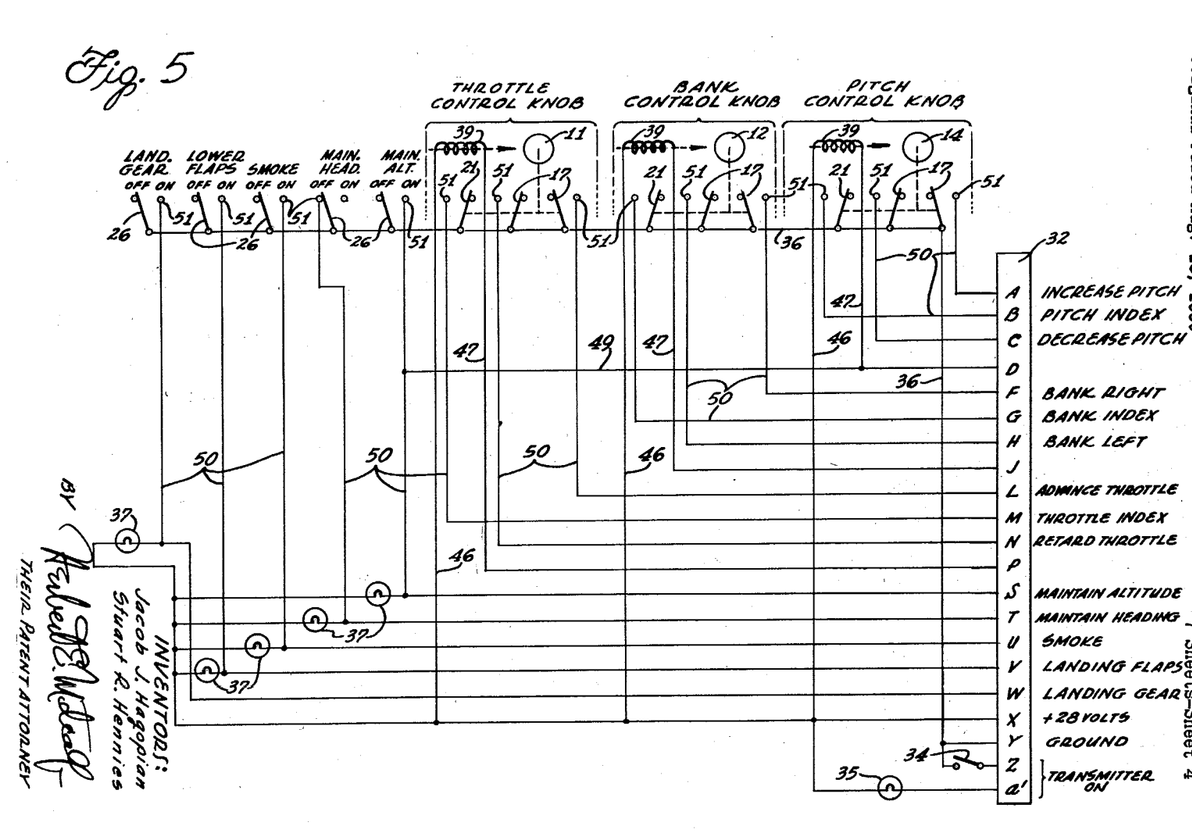
Figure 5 is a schematic wiring diagram of the transmitter controller unit of Figure 2.

Referring to Figure 5, all wiring in the controller unit 9 passes through a controller receptacle 32 in which each wire connection is identified by letter. Leads from this receptacle connect to the transmitter relay unit 10, and through the latter, connection is made to the transmitter 7 and its power supply so that a transmitter "on-off" switch 34, located on the controller unit 9 between pin Z and the grounded pin Y, has control of the plate supply of the transmitter, and so that an operation lamp 35 connected between pin a' and the +28-volt pin X glows when the entire transmitting system is ready for use.

The poles of the control switches 17, synchronizing switches 21, and auxiliary function switches 26, (Figure 2) are electrically connected to a ground wire 36 coming from pin Y. All control switches are shown in their off or unactuated positions, i. e., the attitude control switches 17 and the synchronizing switch 21 are in their normal spring-loaded positions, not contacted by their actuating members. The "maintain heading" auxiliary switch is the only one having its "off" position grounded and this will be referred to later.

Auxiliary function lamps 37 may be included to indicate, when lit, that their respective function switch is in its grounded position.

Figure 7:
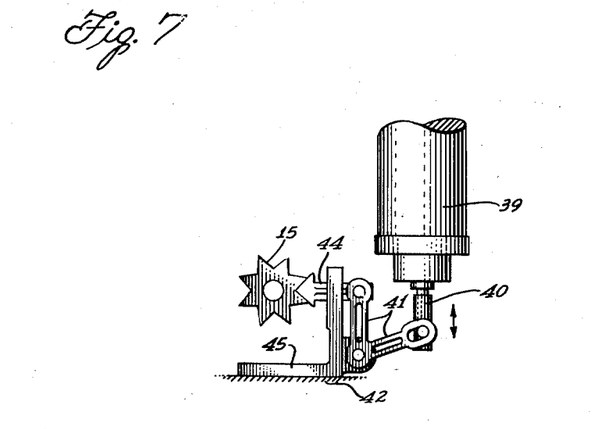
Figure 7 is a partial structural view of the controller unit showing the arrangement of solenoid-operated means for locking the control knobs on the transmitter controller unit.

Adjacent each attitude control knob unit is located a locking solenoid 39, further shown in Figure 7. A solenoid plunger 40 is rotatably connected to a lever 41 which is pivotally mounted on the frame 42 of the controller 9 and which in turn is rotatably connected to a locking stud 44. The stud 44 is slidably supported in a frame-mounted bracket 45 and is positioned to enter and fit one of the tooth spaces of its associated star wheel 15 in a direction perpendicular to the axis of rotation thereof when the solenoid plunger 40 is retracted into the solenoid 39. When the solenoid is energized to retract its plunger, the star wheel and its control knob are locked against turning. One end wire 46 of each of the three locking solenoids 39 is connected to +28 volts at pin X and the other end wires 47 are connected to separate pins D, J and P, respectively. The D pin wire of the pitch locking solenoid is also connected, by a cross wire 49, to the "on" position of the "maintain altitude" switch. Signal wires 50 from the operating positions 51 of all control switches are connected to the remaining receptacle pins, as shown, for the purposes indicated by the functional headings. Control signals are thus produced by grounding these signal wires 50 whenever the switches are so operated.

Figure 6:
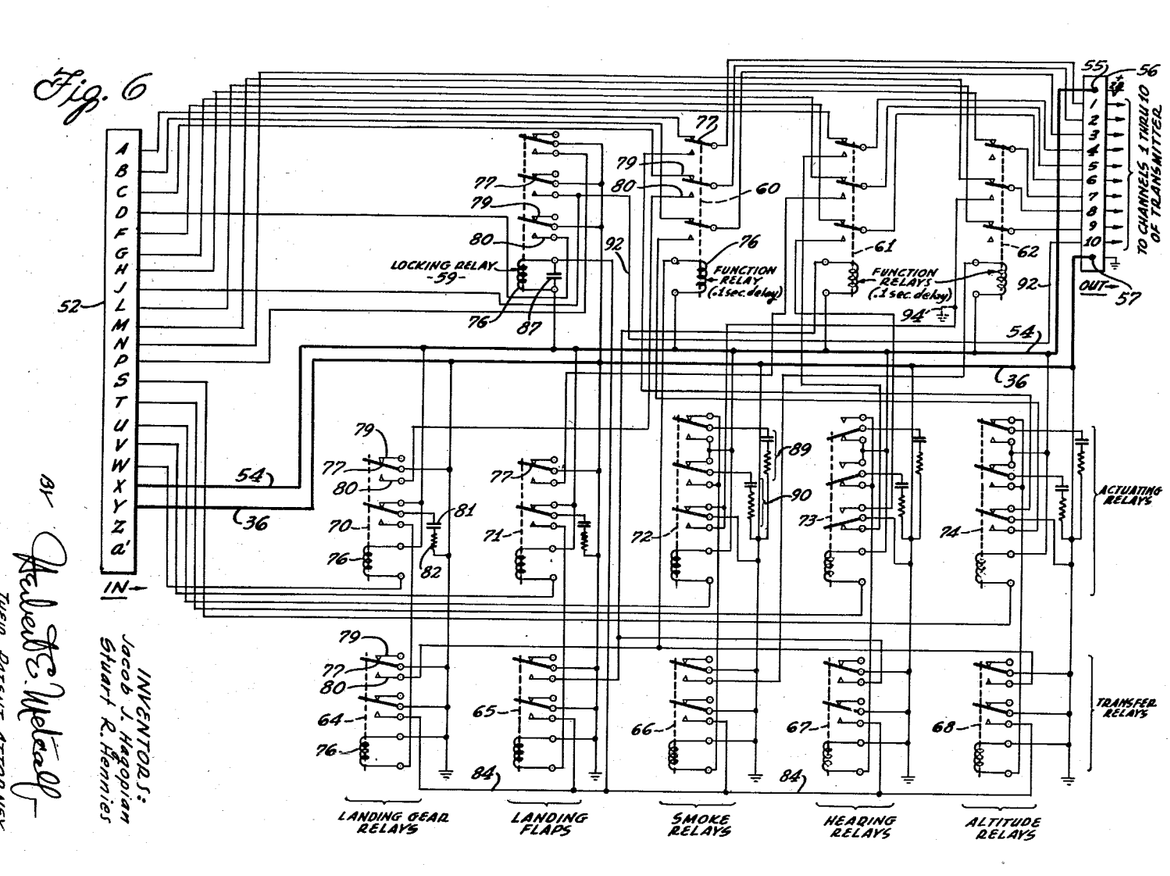
Figure 6 is a schematic wiring diagram of the transmitter relay unit of Figure 2, this unit being directly connected to the apparatus in Figure 5 as indicated by correspondingly lettered output and input leads.

In Figure 6 is shown the complete wiring of the transmitter relay unit 10, staring at the left side with a relay unit plug 52 matching the controller receptacle 32 with identical pin letters. In the relay unit 10, a +28-volt bus 54 extends from pin X to a +28-volt terminal 55 of an output receptacle 56 which is connected by cable, for example, to the transmitter 7 and its power supply. From pin Y, the ground wire 36 is extended through the relay unit 10 to a grounded terminal 57 of the output receptacle 56.

The transmitter relay unit 10 contains a locking relay 59, three 0.1 second delay, slug type, function relays 60, 61 and 62, five transfer relays 64, 65, 66, 67 and 68, and five actuating relays 70, 71, 72, 73 and 74, each of the latter being directly associated with a corresponding transfer relay. These relays are all two-position, multiple pole relays having a relay coil 76, switch poles 77, and upper and lower contacts 79 and 80, respectively, for each switch pole 77. When the relay coils 76 are energized by current flow, the switch poles 77 are brought down to the lower contacts 80, and when the coils are de-energized, the switch poles 77 spring up to the upper contacts 79.

Pins A, B and C are respectively wired to the upper contacts of the top, bottom, and middle switch poles of the left-hand function relay 60. Pins F, G and H are respectively wired to the upper contacts of the top, bottom and middle switch poles of the center function relay 61. Pins L, M and N are respectively wired to the upper contacts of the top, bottom and middle poles of the right-hand function relay 62. Since the function relay switch poles are normally against their upper contacts, these first nine pins are normally connected, electrically, to their respective relay switch poles, the latter being permanently wired to positions one through nine, individually, of the output receptacle 56.

Positions one through ten of the output receptacle 56 are extended to enter the transmitter 7, where they are respectively connected in series with the cathode circuits of the ten audio oscillators previously mentioned, for example. Thus, it is seen that whenever a control switch 17 or synchronizing switch 21 is actuated to the opposite position from that shown in Figure 5, the cathode circuit of its respective audio channel is completed to ground to transmit its particular audio tone. As soon as the control switch is released, as when its control knob is occupying one of of its calibrated steady-state positions, the audio channel is interrupted. This illustrates the specific method of generating signal tonal pulses in the proper modulation channels in this particular embodiment. The transmission of a signal in channel number 10 remains to be discussed.

Pins D, J and P are respectively wired to the lower contacts of the three switch poles of the locking relay 59. These three switch poles are wired to ground, so that energization of the locking relay 59 grounds pins D, J and P, and, therefore, actuates the locking solenoids 39 at all three attitude control knobs 11, 12 and 14. This simultaneous locking action occurs only when one of the auxiliary function switches 26 is operated and will be referred to later.

Pins S, T, U, V and W are respectively wired to the lower coil ends of the altitude actuating relay 74, heading actuating relay 73, smoke actuating relay 72, flap actuating relay 71, and landing gear actuating relay 70. The upper coil ends of these five actuating relays are connected to the +28-volt bus 54. It is thus seen that the "on" position of each auxiliary function switch 26, except the "maintain heading" switch, causes energization of its respective actuating relay for as long as the switch remains in that position.

At the landing gear actuating relay 70, the lower contact of the top switch pole is wired to the lower contact of the middle pole of the left-hand function relay 60. The bottom switch pole of the landing gear actuating relay 70 connects to a 100 mfd. capacitor 81 on the other side of which is a 500-ohm resistor 82 connected in turn to ground. The lower contact of the bottom pole connects to one coil end of the landing gear transfer relay 64, the other end of which is grounded.

At the landing gear transfer relay 64, the lower contact of the top pole is wired to one coil end of the left-hand function relay 60, the other end of which connects to the 28-volt bus 54, and the lower contact of the bottom pole is connected to a locking relay feed wire 84. This feed wire 84 connects to one coil end of the locking relay 59, the other end of which connects to the 28-volt bus 54, and a 100 mfd. transfer holding capacitor 87 is connected across the coil of the locking relay 59. From the lower contact of the middle pole of the locking relay 59, a transfer channel feed wire 92 connects to position number 10 of the output receptacle 56.

The top pole of the landing gear actuating relay 70 connects to ground, the same as both poles of the landing gear transfer relay 64, while the upper contact of the bottom pole of this actuating relay 70 connects to the bus 54.

The flap actuating relay 71 and transfer relay 65 are likewise wired between themselves, to ground, and to the bus 54, with these exceptions: the lower contact of the top pole of the actuating relay 71 is wired to the lower contact of the middle pole of the center function relay 61, and the lower contact of the top pole of the transfer relay 65 is wired to one coil end of the center function relay 61, the other end of which connects to the bus 54.

Sufficient structure has thus far been disclosed to ascertain the basic features of this invention. Taking the landing gear auxiliary function switch as an example, operation is as follows. Throwing this switch to the "on" position energizes the landing gear actuating relay 70, as previously explained. As an immediate result, the lower contact of the middle pole of the left-hand function relay 60 is grounded through the top pole of the actuating relay 70 which is now in its down position; and the top of the 100 mfd. capacitor 81, which was previously charged to +28 volts, is connected to the ungrounded coil end of the transfer relay 64 through the bottom pole of the actuating relay 70, thereby energizing the transfer relay 64 for a period of time until the capacitor discharges below a critical value.

Therefore, the next events following energization of the transfer relay 64 are the grounding of the locking relay feed wire 84 through the bottom pole, which starts transmission of an audio signal in channel number 10 simultaneously with actuating the locking relay 59, due to the transfer feed wire 92, and the grounding of one end of the left-hand function relay 60 coil, causing energization thereof (after its built-in time delay has expired) because of the bus 54 connected to the other end, this latter grounding being obtained through the top pole of the transfer relay 64. Energization of the left-hand function relay 60 brings its middle pole to the lower contact thereof, which is now grounded by the actuating relay 70, thereby starting transmission of an audio signal in channel number 2 while channel number 10 is still actuated.

It is now obvious from Figure 3 that when a tone pulse is being received simultaneously in channel numbers 10 and 2, the result is a 28-volt signal in the "lower landing gear" line, since the channel numbers 10 and 2 filters are both passing a current which acts to operate control relays (not shown) to connect the aircraft's power supply to the single transfer relay 29a and to the circuit of channel number 2. This signal pulse actuates a landing gear holding relay 85 in the output adapter 4 which connects +28 volts to output wire $f$ leading to a landing gear release solenoid (not shown).

As the charge of the capacitor 81 is being removed through the landing gear transfer relay 64, which preferably has about 1250 ohms resistance, the pull against the switch pole springs reduces until the poles of the transfer relay 64 snap back to their upper contacts, and this immediately de-energizes the left-hand function relay 60 to unground its middle pole and stop transmission of a tone in channel number 2. However, the locking relay 59 does not become immediately de-energized, due to the charge stored on the transfer holding capacitor 87. Approximately one-tenth to one-fifth second after de-actuation of the transfer relay 64, the holding capacitor 87 allows deenergization of the locking relay 59 to unlock the control knobs and to stop transmission in channel number 10. The landing gear auxiliary function switch is still in the "on" position and the actuating relay 70 still energized, but the entire primary control system is back to normal after automatically transferring to the second set of functions by means of the single transfer relay 29a in the output adapter 4 and back again to the first.

In the above operation, the timing of the various relays is such that the transfer tone in channel number 10 is transmitted for approximately one-half second, and the function tone in the signal channel is transmitted for approximately one-fourth second in the center of the one-half second interval. There is, therefore, no chance for the signal pulse to be received by the wrong control circuit, as would be the case if the transfer tone were not present during the entire signal pulse when an auxiliary function switch is operated.

It will also be noted that when the left-hand function relay 60, in the preceding example, is energized, the channel numbers 1 and 3 will be energized by virtue of the grounding of either the top or bottom pole of this function relay 60. This will be accomplished at the altitude actuating relay 74 which has its bottom pole connected to ground, and its bottom pole upper and lower contacts connected respectively to the lower contacts of the top and bottom poles of the left-hand function relay 60. Thus, what actually happens in this specific apparatus is that a repeat signal will also be sent via either channel number 1 or 3, depending on the position of the altitude actuating relay 74. This repeat signal will merely energize, in the output adapter 4, one of the altitude control relays (not as yet discussed) which is already in a position in agreement with this energization so that no change in the altitude system is involved or caused by operation of the landing gear switch discussed above. The repeat signal is merely an incidental occurrence arising from the use of the three-pole function relays 60, 61 and 62. Of course, nine single-pole function relays could be used, if desired, but the repeat signal is not objectionable since nothing happens as far as the controls are concerned.

The landing gear control function, as described in this embodiment, provides for only one way action (lowering) of the landing gear in that it cannot be retracted since its holding relay 85 in the output adapter 4 remains energized until electrical power in the aircraft is completely shut off. The same is true of the "lower landing flaps" operation, which controls a flap holding relay 86 in the output adapter 4, so that the "off" position of these two auxiliary function switches has no effect after having once been turned on. This is, however, only a matter of choice, and the remaining functions which can be turned off or on, at will, will now be described.

At the smoke actuating relay 72 both the upper and lower contacts of the bottom pole are connected to the lower contact of the middle pole of the right-hand function relay 62. The top and middle poles of the smoke actuating relay 72 are respectively connected to a first and second condenser and resistor combination 89 and 90, respectively, and then to ground, instead of only one such circuit at either the landing gear or flap actuating relay. The upper contact of the top pole and the lower contact of the middle pole of the smoke actuating relay 72 are both wired to one coil end of the smoke transfer relay 66, the other end of which is grounded, while the lower contact of the top pole and the upper contact of the middle pole are wired to the 28-volt bus 54.

At the smoke transfer relay 66, the lower contact of the top pole is wired to one coil end of the right-hand function relay 62, the other end of which is connected to the bus 54. Also, the lower contact of the bottom pole of this relay is connected to the locking relay feed wire 84, and the remainder of the smoke relay wiring is similar to that of the landing gear and flap relays.

In the operation of the smoke function, as the smoke actuating relay 72 is now pictured, the second condenser and resistor combination 90 is charged to +28 volts, while the first combination 89 is discharged, since both ends of it are completed to ground. When the smoke function switch (Figure 5) is moved to the "on" position, energization of the smoke actuating relay 72 causes discharge of the second condenser combination 90 through the smoke transfer relay 66, causing its actuation, as described for the other transfer relays. In this manner, a signal in channel number 10 is again sent, accompanied by a shorter signal in channel number 8. In the output adapter 4, a 28-volt pulse is thus caused in the "smoke" lead to which is operatively connected a smoke impulse relay 91. This relay is now energized to connect +28 volts to a smoke signal line c to turn on a smoke generator (not shown) in the aircraft.

When the 28-volt pulse in the "smoke" lead ceases, due to sufficient condenser discharge through the smoke transfer relay 66, the smoke impulse relay 91 will be de-energized but its contacts will remain in the position leaving the smoke generator turned on.

It is now obvious that the first condenser combination 89 has been charged by means of the top pole of the smoke actuating relay 72 occupying its lower contact position, since this relay remains energized all the while the smoke function switch is "on." Therefore, when the smoke switch is turned "off," the smoke transfer relay 66 will be actuated in the same manner and for the same time interval as before due to the discharge of the first condenser combination 89 through the top pole of the smoke actuating relay 72. Accompanying this action, a second signal pulse is transmitted in channel number 8 from the ground connection of the upper contact of the bottom pole of the smoke actuating relay 72, as well as the attendant transfer pulse in channel number 10. This time, the smoke impulse relay 91 will be operated to open its contacts, since with every other signal pulse the contacts open and with every other alternate signal the contacts close.

Since both on and off smoke pulses are transmitted in channel number 8, the lower contact of the middle pole of the right-hand function relay 62 could actually be directly grounded, if desired, as indicated by dotted lines 94 in Figure 6. However, the smoke actuating relay 72 is shown herein as being wired similarly to all other actuating relays.

The action of the locking relay 59 is also evident whenever one of the auxiliary function switches 26 is operated. The locking relay 59 is energized simultaneously with the transmission of the transfer pulse in channel number 10 so that none of the attitude control knobs can be turned while any of the function relays have disconnected the pitch, bank or throttle signal leads from their respective nine audio channels. This prevents the remote operator from inadvertently or otherwise turning a control knob when it would naturally have no control effect and throw the controller out of synchronization with the control members on the aircraft. At the expiration of only about one-half second, the locking relay 59 is de-energized and it is then possible to operate any switch or knob on the transmitter controller 9. The holding capacitor 87 has no appreciable lagging effect when the locking relay 59 is energized, but detains its de-energization long enough to insure that the transfer tone overlaps the function tone at its rear edge.

The remaining two sets of actuating and transfer relays are for control of the automatic heading and automatic altitude systems in the autopilot of the aircraft 1. These functions may be turned on and off any number of times similarly to the smoke system, due to the double capacitor circuits. The on and off signals of either the altitude or heading system, however, are accomplished in two different modulation channels. As shown in Figure 6, the upper and lower contacts of the bottom pole of the heading actuating relay 73 are wired respectively to the lower contacts of the bottom and top poles of the center function relay 61, while the lower contact of the top pole of the heading transfer relay 67 is wired to the upper coil end of the center function relay 61 in parallel with the lower contact of the top pole of the flap transfer relay 65. The altitude actuating relay 74 connections have previously been described as leading to the left-hand function relay 60, and the lower contact of the top pole of the altitude transfer relay 68 is connected to the upper coil end of the left-hand function relay 60, in parallel with the lower contact of the top pole of the landing gear transfer relay 64.

The "maintain heading, on" signal is, therefore, transmitted in channel number 6, "maintain heading, off" signal in channel number 4, "maintain altitude, on" in channel number 3, and "maintain altitude, off" in channel number 1. Thus, all channels are utilized to carry two functional signals each, except channels number 7 and 9, which are unused in this particular apparatus for an auxiliary function.

For the "maintain heading" system, a heading latching relay 95 is located in the output adapter 4. This relay contains an "on" coil 96 and an "off" coil 97 which govern the position of a single pole, double throw relay switch 99. When the "on" coil 96 is energized, the relay switch 99 will be connected to a +28 volt position 100, and when the "off" coil 97 is energized, the switch will be connected to an "off" position 101 which leaves the switch circuit open. The "on" coil 96 is connected to be actuated from a control pulse signal in channel number 6 when the single transfer relay 29a is also energized, and the "off" coil 97 is connected to be actuated by a signal in channel number 4 when the single transfer relay 29a is energized.

The pole of the relay switch 99 is connected by a heading signal line n through the operating contacts of a heading control relay 102 in the control unit 5 to a normally closed position of a heading failure switch 104 from which the automatic heading system in the autopilot obtains its signal.

It is thus seen that a 28-volt pulse is produced through the "on" coil 96 when the heading function switch on the controller 9 is moved to the on position to turn on the automatic heading system in the aircraft by energizing it from the 28-volt power supply, and that a 28-volt pulse is produced through the "off" coil 97 when the heading function switch is moved to the off position to turn off the heading system.

The actuating coil of the heading control relay 102 is operatively connected into the bank indexing circuit so that the heading signal line n is opened whenever the bank control members are out of the index (level flight) position, and completed when these members are in the index position. Thus, if the "maintain heading" switch is on, the bank control knob 14 may be operated as usual, and whenever the bank index position is reached, the automatic heading system will automatically be turned on to maintain the existing heading of the aircraft 1. This differs from the action of the automatic altitude system operation, because in the latter, whenever the "maintain altitude" switch is turned on, the pitch locking solenoid in the controller 9 is energized so that the pitch control knob 12 cannot be turned from its existing position. This is accomplished by the cross wire 49 (Figure 5) which completes the pitch locking solenoid, only, to ground through the operating position 51 of the "maintain altitude" switch when this switch is moved to the on position.

In the output adapter 4, an altitude latching relay 105 and altitude signal line k are provided to make the on and off remote control signals actuate the automatic altitude system the same as the heading system. The only difference is that in the control unit 5, no control relay for the altitude system is provided in the pitch index circuit. The altitude signal line *k* leads directly to a normally closed position of an altitude failure switch 106 (Figure 4) from which the altitude system in the autopilot receives its signal.

This completes the description of the automatic duplexing means which makes possible the control of any auxiliary function from a single switch or knob, and which gives substantially continuous control since the maximum waiting time between the operation of any two controls is only approximately one-half second. Since the primary flight attitude control signals are all transmitted without actuation of any of the transfer relays, these three controls (throttle, pitch and bank) can be operated simultaneously, no matter what the direction of movement of each.

In the control unit 5, the heading failure switch 104 and the altitude failure switch 106 are both actuated by the command failure relay 31, along with a 40-degree bank switch 107, bank failure switch 109, pitch failure switch 110, smoke failure switch 111, and throttle failure switch 112. As seen in Figure 4, whenever the command failure relay 31 is energized, the throttle, pitch, and bank potentiometers 30 are indexed, the smoke function is turned on, automatic altitude control is turned on, automatic directional control is turned off, and the aircraft is put into a 40-degree left bank by taking the bank signal from a tapped connection 114 on the bank stepping potentiometer. The command failure relay 31 is energized as follows:

A "command failure" signal line *a* leads from the ungrounded end of the command failure relay 31 to one contact of a first motor-operated delay relay 115 in the output adapter 4. The other operating contact of this motor relay is connected to +28 volts so that energization of motor delay relay 115 causes energization of the command failure relay 31. The motor delay relay 115 is operatively wired, through the contacts of a second motor delay relay 116, to the receiver and selector 3, where it is arranged by suitable means (not shown) to be connnected to +28 volts whenever the transmitter carrier wave drops below a predetermined intensity level, or when the receiver output disappears due to other failure.

The first motor-operated delay relay 115, in this particular embodiment, has an adjustable delay of from 3 to 30 seconds. This delay provision allows any momentary fade-out of the radio signal to be un-noticeable as far as the command failure system is concerned. The second motor delay relay 116 gives approximately a 1-minute delay for the purpose of preventing the command failure circuit from operating immediately following launching of the aircraft 1, while it is climbing to a reasonably safe altitude, before going into the 40-degree bank at constant altitude, if the transmitting or receiving means should fail. After the 1-minute interval, the contacts of the second motor delay relay 116 close and remain closed since it is a reset type requiring a manual operation to re-open it after once closing.

Energization of the second motor delay relay 116 may be started by an initiating relay 117 which is itself energized from the instant of forward motion of the aircraft when launched until it leaves contact with the ground or launching device. The initiating relay 117 is also a reset type in which its contacts, which form the complete energization circuit of the second motor delay relay 116, remain closed after energization ceases until manually opened again.

Figure 8:
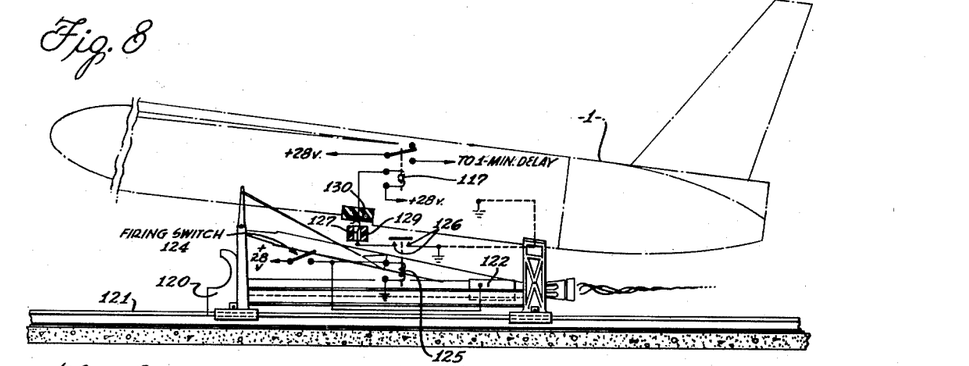
Figure 8 is a elevation view of the aircraft in position on a launching device, showing in schematic form a circuit means for energizing a time delay relay in the craft at the same time as starting the launching device.

Energization of the initiating relay 117 may be accomplished by any suitable means, such as that shown in Figure 8, for example. Here the aircraft 1 is supported by a launching device 120 operating on a track 121 and adapted to be driven by rocket motors 122. In the launching device 120, a rocket firing switch 124 is connected to energize the rocket motors 122 at the time of launching, when this firing switch 124 is closed, preferably by remote control means. Also connected to be energized by the firing switch 124, when closed, is a firing relay 125 whose relay contacts 126 will complete a circuit between ground and a spring contact 127 mounted to project upwardly from the launching device 120 through an insulated support 129. A contact pad 130, mounted flush with the bottom surface of the aircraft 1, and insulated therefrom, is arranged to make electrical contact with the spring contact 127 when the craft is in launching position. The contact pad 130 is wired to one coil end of the initiating relay 117, the other end of which is wired to +28 volts of the aircraft's power supply.

Before launching the aircraft 1, the firing relay 125, initiating relay 117, and second motor delay relay 116 are all de-energized and their opertaing contacts are open. When the firing switch 124 is closed, the aircraft and launching device accelerate along the track 121 and the firing relay contacts 126 close to energize the initiating relay 117 in the aircraft. This closes the circuit of the second motor delay relay 116 and starts the 1-minute delay period before the command failure circuit to the first motor-operated delay relay 115 can be completed. The aircraft engine is also accelerated at this time, although the means for doing this is not shown. When the aircraft 1 separates from the launching device 120 at flying speed and the contact pad 130 thus breaks connection with the spring contact 127, the initiating relay 117 will be deenergized for the rest of the flight, but the circuit to the second motor delay relay 116 remains closed, as stated previously. As soon as the second motor delay relay contacts are closed at the end of the 1-minute period, normal flying conditions are reached, and the command failure system is in readiness for operation, subject only to the first motor-operated delay relay 115, which can operate on or off any number of times.

Thus, it is seen that a thorough emergency procedure is provided in the event of the radio signal becoming inoperative for any reason. Additional safety is incorporated over the normal methods in that a command signal failure during, or immediately following, launching is deferred until a predetermined altitude is reached, so that the aircraft 1 is under steady predictable control at all times. This predetermined altitude will be reached since the controls are fixed, during launching, in positions causing a normal climb. After restoration of signal power following a command failure, the command failure relay 31 will again become de-energized and the aircraft 1 is thereby brought back to normal control at throttle index, pitch index, and bank index positions.

Figure 10:
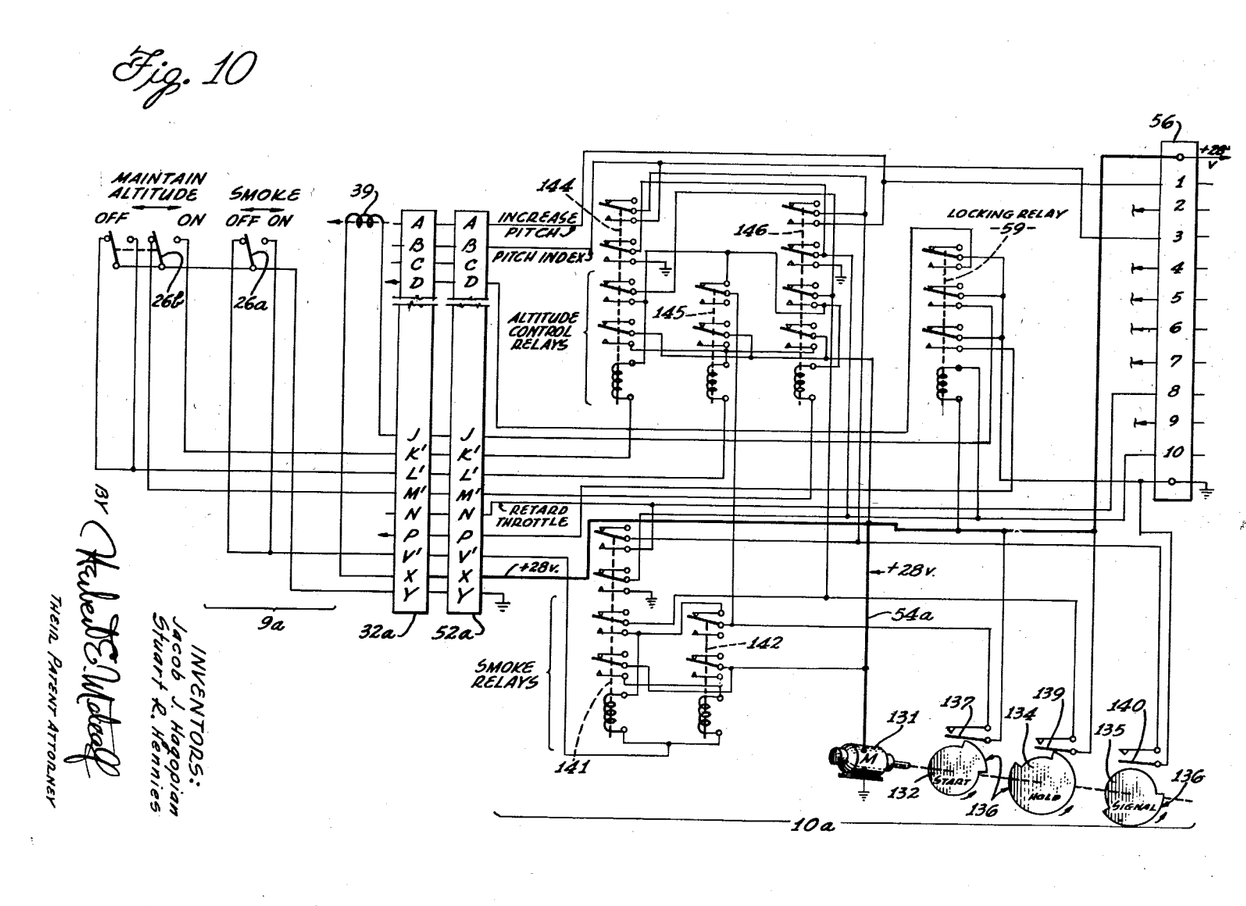
Figure 10 is a schematic wiring diagram showing a portion of a modified transmitter controller unit and relay unit as used in the alternate embodiment.

In another embodiment of this invention, the auxiliary function controls are transmitted in their proper channels and to their respective control circuits in the output adapter 4 by means of a different apparatus, as shown in Figure 10. In this alternate apparatus, a modified transmitter relay unit 10a incorporates a continuous pulse generating means from which the auxiliary function signals and function transfer signals are taken. This pulse generating means comprises a constant speed motor 131, a motor driven starting cam 132, a motor driven holding cam 134, and a motor driven signal cam 135, all three cams revolving at the same speed. An actuating surface 136 on each cam is provided to close a switch arranged to be contacted by the actuating surface 136. In this manner, a starting switch 137, holding switch 139, and signal switch 140 are respectively closed when contacted by their corresponding cams.

Figure 9:
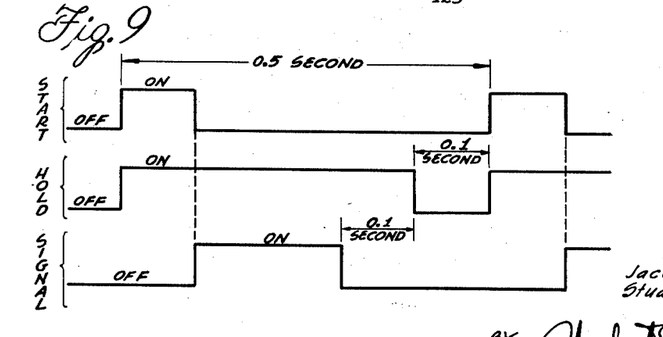
Figure 9 is a diagram showing the time relationship of 28-volt pulses used in an alternate function transfer embodiment of the present invention.

On the starting cam 132, the actuating surface forms about one-fifth of the total cam circumference; on the holding cam 134, the actuating surface forms about four-fifths of the circumference; and on the signal cam 135, the actuating surface forms about two-fifths of the circumference. These cams are carefully aligned with respect to each other so that, when rotating in a counterclockwise direction, the starting switch 137 and the holdings switch 139 are closed simultaneously and the signal switch 140 is closed one-fifth of a revolution of the cams later. The resulting pattern or combination of pulses is shown in Figure 9 where an open switch condition is "off," and a closed switch condition is "on." With a motor driving the cams at a speed of 120 R. P. M., for example, the pulses will have a period of 0.5 second, and the widths and relative phases of the pulses are as indicated in Figure 9. It will now be explained how the signal switch 140 produces the axiliary function signal tone in one of the first nine channels; the holding switch 139 produces the transfer tone in channel number 10 overlapping the auxiliary signal tone, and the starting switch 137 provides a means of preventing a partial signal pulses from being transmitted, no matter at what instant the auxiliary function switch on the controller is operated.

Referring again to Figure 10, only two auxiliary function circuits are shown, altitude control and smoke signal control. These represent the only two different signal circuits of this invention, the first requiring on and off signals in two different modulation channels, and the second requiring only one channel for on, or for on and off signals. In the modified transmitter relay unit 10a are located a four-pole smoke control relay 141, two-pole smoke holding relay 142, four-pole altitude "on" relay 144, two-pole altitude holding relay 145, and four-pole altitude "off" relay 146, besides the locking relay 59. Initiating signals from the on-off smoke and altitude function switches are applied at the lower ends of these relays through pins K', L', M' and V' of relay unit plug 52a, which signals consist of grounding these respective relays at their lower ends, similar to the method of control in the first embodiment.

At each of the four-pole relays, the pole immediately under the top pole will be referred to as the second pole, and the pole immediately under the second pole will be referred to as the third pole.

At the smoke holding relay 142, the upper coil end is connected to the lower contacts of the bottom poles of the smoke holding relay 142 and the smoke control relay 141. The bottom switch pole of each smoke relay 141 and 142 is connected to a +28 volt bus 54a. The top switch pole of the smoke holding relay 142 is connected to one side of the starting switch 137, the other side of which leads to the bus 54a. The upper contact of the top pole of the smoke holding relay 142 is wired to the lower contact of the third pole of the smoke control relay 141 and also to the upper coil end of this contact relay 141.

The third switch pole of the smoke control relay 141 is wired to one side of the holding switch 139, the other side of which is bussed. The lower contact of the second pole of the smoke control relay 141 is grounded and the second pole is wired to position number 10 on the output receptacle 56, which position sends the transfer tone in channel number 10 as before. This second pole also connects to one coil end of the locking relay 59, the other end of which is connected to +28 volts as in the previous embodiment. The individual locking solenoids 39 in the controller 9a are energized, as before, through pins D, J and P which are grounded by actuation of the locking relay 59, so that locking of the three control knobs 11, 12 and 14 is accomplished during the transmission of the transfer tone. The lower contact of the top pole of this smoke control relay 141 is wired to position number 8 of the output receptacle 56, and the top pole connects to one side of the signal switch 140, the other side of which is grounded. The constant speed motor 131 is operatively connected in the 28-volt power supply in the relay unit 10a.

In the modified controller unit 9a, the smoke function switch 26a is a single pole, double throw switch having its pole grounded and both throw positions connected to pin V' on controller receptacle 32a. The altitude function switch 26b is a double pole, double throw switch having both poles grounded, the on and off positions of one pole both connected to pin L', and the on and off positions of the second pole connected respectively to pins K' and M'.

Operation of the smoke function system is then as follows: Assuming at first that the smoke switch 26a is positioned midway between on and off, both the smoke control and holding relays 141 and 142 are de-energized and occupying the position shown. Therefore, nothing is happening as a result of the rotation of cams 132, 134 and 135, since their switch circuits are dead-ended either at the relay contacts or at the controller end of the relay coils. If the smoke impulse relay 91 in the output adapter 4 is in the off position (not connecting the smoke generator to +28 volts), for example, moving the smoke function switch 26a to its on position will ground the two smoke relays 141 and 142 immediately if the starting switch 137 is closed, or at the next time the starting switch is closed as the starting cam 132 rotates. When this happens, the smoke control relay 141 is energized due to its connection to +28 volts through the upper contact of the top pole of the smoke holding relay 142. Actuation of the control relay 141 feeds +28 volts to the top of the holding relay through the bottom pole of the control relay 141, thus causing its actuation, but in the meantime, the third pole of the control relay 141 connects the top coil end of its relay to +28 volts from the holding switch 139 so that the control relay 141 remains energized even though the starting circuit through the top pole of the holding relay 142 has been broken.

When the control relay 141 was first energized, its second pole grounded the control circuit of channel number 10, thus starting transmission of the transfer tone, and simultaneously energizing the locking relay 59 to operate the locking solenoids 39 (only one of which is shown) in the controller 9a through pins D, J and P. While both smoke relays 141 and 142 remain energized, the signal switch 140 will next be closed approximately 0.1 second after the transfer tone was started, as shown in Figure 9. This grounds the signal circuit of channel number 8 through the top pole of the control relay 141, and the function signal will, therefore, be sent in channel number 8 (while the single transfer relay 29a in the output adapter 4 is energized) for a time interval of approximately 0.2 second, as determined by the closing and opening of the signal switch 140. The smoke function in the aircraft 1 has now been turned on, according to the description given previously.

Next, when the holding switch 139 opens, the control relay 141 opens, stops the transfer tone in channel number 10, and unlocks the attitude control knobs. Initially, the holding relay 142 was energized only by the fact that the bottom pole of the control relay 141 was closed against its lower contact. After the holding relay 142 did become energized, however, +28 volts was connected directly to the upper end of its coil through its bottom pole contact. Therefore, the holding relay 142 is now locked in its actuated position, and will remain so until its lower coil end is ungrounded. Thus, it is seen that succeeding closures of the starting switch 137 with every revolution of the starting cam 132 will have no effect on the smoke function, since the top pole of the holding relay 142 is dead-ended against its lower contact. Only one signal pulse has thus been sent in channel number 8.

It will be noted again that if the smoke function switch 26a is operated between two "on" pulses of the starting switch 137, nothing will happen until the next starting pulse arrives, thus preventing the transmission of a partial signal pulse which might not be properly received. If the function switch is operated during a starting pulse, the transmitting sequence will proceed immediately, and the only difference will be a shorter transfer tone than normal, but still overlapping the signal tone at both ends.

If the smoke function switch 26a is now moved to the off position, the holding relay 142 will be de-energized when the switch is between the on and off positions, thus connecting the top pole of the holding relay 142 to the top of the coil of the control relay 141 and setting up the relays for another signal sequence when the starting switch 137 is next closed. This is true because in the off position of the smoke switch 26a, both relays 141 and 142 are grounded again at their lower ends. Therefore, another signal tone will be transmitted in channel number 8, at the same time as the transfer tone in channel number 10 is sent, to furnish another pulse to the smoke impulse relay 91 in the output adapter 4. Of course, the controller wire to the off position of the smoke switch 26a could be omitted, but in that event, another smoke signal pulse could not be transmitted until the switch was moved back to the on position.

To secure on and off signals in two different modulation channels for the automatic altitude control system, for example, four relays could be used to provide a double set similar to the smoke control and holding relays 141 and 142. However, three relays can be made to do the same job, as will now be described. The altitude "on" relay 144 is connected at its lower end to pin K', the altitude holding relay 145 to pin L', and the altitude "off" relay 146 to pin M' of the relay unit plug 52a. With the connections to the altitude function switch 26b as previously described, it is seen that in the off position of this switch, the altitude holding relay 145 and "off" relay 146 are grounded at their lower ends, and when the altitude switch 26b is in the on position, the holding relay 145 and "on" relay 144 are likewise grounded.

The altitude "on" and "off" relays 144 and 146 are wired identically with each other with one exception. The lower contact of the top pole of the "on" relay 144 is wired into channel number 3, while the lower contact of the top pole of the "off" relay 146 is wired into channel number 1. Otherwise, the corresponding poles and contacts of these two relays are connected directly to each other, and they are each connected to the altitude holding relay 145 exactly like the smoke holding relay 142 is connected to the smoke holding relay 141.

Operation of the altitude system is thus identical to the method of operation of the smoke function except that two modulation channels are used. Shifting the altitude switch 26b to the on position, for example, makes use of the altitude "on" and holding relays 144 and 145, to produce a function pulse in channel number 3 while the transfer tone in channel number 10 is on, which turns on the automatic altitude equipment for the autopilot by use of the altitude latching relay 105, as previously described. Again, shifting the altitude switch 26b from on to off makes use of the "off" and holding relay 146 and 145 to send function signal tones in channels number 1 and 10. The ground connection to the altitude holding relay 145 is opened whenever the altitude switch 26b is switched from one position to the other. This circuit breaking between the two positions of the function switches is depended upon for enabling a signal pulse to be transmitted, since the holding relays 142 and 145 are continuously energized as long as the function control switches are left in any one position.

In the apparatus of Figure 10, no function relays such as the relays 60, 61 and 62 in Figure 6 are used. The primary attitude control circuits, such as "increase pitch" and "pitch index," are directly connected into the lower contact of the top pole of the auxiliary function relay assigned to the same respective channel, so that the first nine output circuits from the relay unit 10a are ready for use when grounded individually by the control knobs or in combination with the circuit of channel number 10 by operation of an auxiliary function switch.

This alternate embodiment presents certain advantages over the structure of Figure 6. First, no delay relays or holding condensers are necessary to provide sequential operation when one of the actuating relays is energized. All poles of any relay in Figure 10 are switched from one position to the other in a normal, substantially simultaneous manner, and more positive contact action is thus obtained. Second, a possible drop in supply voltage from 28 volts, to, say 22 or 24 volts, will not adversely affect the operation of any of the relays, whereas with the timing condenser circuits of the first embodiment 28 volts is a relatively low charge in the first place, and a voltage drop in the power supply to an unexpected low value might prohibit the desired relay action when the condensers are discharging. The operation of the second embodiment does not involve such critical adjustments or conditions for proper control.

In the case of the second embodiment, as shown in Figure 10, the pitch control knob, only, may be locked when automatic altitude control is turned on, if desired by the same means as in Figure 6, since the locking solenoids 39 are in three separate circuits. The only thing that might be called a disadvantage of this alternate auxiliary function apparatus is that a slightly longer time may be involved from the moment of auxiliary function switch operation to the moment when the control knobs 11, 12 and 14 are released from their locking solenoids 39. The maximum time for this interval, however, is only 0.8 second, as can be seen from Figure 9, when using the pulse widths and speeds therein indicated. The average waiting time after operating an auxiliary function switch and before operating a primary control knob thereafter is in the neighborhood of 0.6 second or less, which still gives a nearly perfect sense of continuous control.

Another point which should be noted from the foregoing specification is that the duplexing of modulation channels can be continued further to obtain still more control circuits in the ouput adapter 4 from the same number of available channels in the radio link, if desired. For example, the present embodiments start with 10 available channels, one of which is used solely as a transfer channel to make available at the output a selection of two functions for each of the remaining nine channels. This results in a total of 2(10−1), or 18, functonal control circuits.

Now a second channel could also be used as another duplicator of the remaining channels. In this manner, a total of 3(10−2), or 24, functional control circuits could be obtained. Using three of the original 10 channels for transfer purposes only, a total of 4(10−3), or 28, functions could be controlled, and so on, but each additional transfer channel used in this manner produces a lesser and lesser gain, making it less and less practical to provide the extra transfer channels necessary to achieve the maximum possible number of control functions by this method. However, the teachings of this application include the use of a plurality of transfer channels, as well as only one transfer channel, since all that is necessary to continue this duplexing procedure is to supply the additional function transfer relays, which makes it possible to transmit three or more audio tones simultaneously.

It is thus seen that our invention provides a complete, remote, radio control system having duplexing means for obtaining a great many more control functions than there are modulation channels in the radio control link, and it provides this means in such a completely automatic way that a substantially continuous control system is provided, which necessitates the operation of only one control member to get practically instantaneous response from any of the control functions. This system provides complete control, including automatic emergency operation, of an aircraft, test missile, or the like, from launching through landing, and safety features provided by the control knob locking solenoids make it impossible for the remote operator of the controller unit to operate the system incorrectly.

From the above description it will be apparent that there is thus provided a device of the character described possessing the particular features of advantage before enumerated as desirable, but which obviously is susceptible of modification in its form, proportions, detail construction and arrangement of parts without departing from the principle involved or sacrificing any of its advantages.

While in order to comply with the statute, the invention has been described in language more or less specific as to structural features, it is to be understood that the invention is not limited to the specific features shown, but that the means and construction herein disclosed comprise the preferred form of several modes of putting the invention into effect, and the invention is therefore, claimed in any of its forms or modifications within the legitimate and valid scope of the appended claims.

What is claimed is:

1. Means for controlling a device to be initially launched from rest and thereafter have its movements remotely controlled, said device having a plurality of movable control members, wherein remote manually operated radio transmitting means transmits control signals to receiving and selecting means in said device; the combination comprising a control circuit normally connected to operate one of said control members in accordance with manually initiated signals from said transmitting means, means for switching said control circuit from its normal connection to a pre-set connection for maintaining said control member in a desired emergency operating position while said switching means is actuated, and automatic actuating means for said switching means comprising an electrical actuating line connected at one end thereof to said switching means and adapted to be connected at the other end to an actuating source only while the signal output from said receiving means has failed, a normally open, delay-operated switch in said line connected to be closed only while the line portion from said other end to said delay switch has been completed due to signal failure for a first predetermined time interval, a starting switch in said line, time delay means adapted to latch said starting switch closed after being energized for a second predetermined time interval, said time delay means being de-energized and said starting switch being open prior to launching of said device, and means for energizing said time delay means simultaneously with launching said device, whereby said control circuit cannot be switched to said pre-set emergency connection during said second predetermined time interval which immediately follows launching, and whereby after said second time interval, said control circuit cannot be switched to said pre-set emergency connection until after a continuous signal failure duration equal to said first time interval.

2. Apparatus in accordance with claim 1 wherein a launching device is provided to furnish thrust to said remotely controlled device during the first portion of said launching, and wherein said energizing means includes an energizing switch in said remotely controlled device and circuit means partially in said controlled device and partially in said launching device connected to throw said energizing switch to an energizing position simultaneously with the first motion of said launching device, said energizing switch being adapted to remain in said energizing position after said controlled device has separated from said launching device, whereby said second time interval can be as long as desired.

3. Automatic emergency control means for an aircraft to be initially launched and having an electrical control circuit normally connected to operate a control member of said aircraft in accordance with radio signals from a manually operated remote transmitter, which comprises a pre-set emergency connection for said control circuit not associated with said transmitter, means for switching said control circuit from its normal connection to said pre-set emergency connection in the event of failure of said transmitted signals to maintain a certain minimum strength at said aircraft, and delay means for preventing operation of said switching means for a predetermined time after launching of said aircraft, said delay means comprising a reset type switch connected in series with said switching means, a time delay relay connected to operate said reset switch after said time delay relay is energized for said predetermined time interval, and means for energizing said time delay relay simultaneously with launching of said aircraft.

4. Automatic emergency control means for an aircraft to be initially launched and having an electrical control circuit normally connected to operate a control member of said aircraft in accordance with radio signals from a manually operated remote transmitter, which comprises a pre-set emergency connection for said control circuit not associated with said transmitter, means for switching said conrol circut from its normal connection to said preset emergency connection in the event of failure of said transmitted signals to maintain a certain minimum strength at said aircraft, and delay means for preventing operation of said switching means for a predetermined time interval after launching of said aircraft, a launching device to furnish thrust to said aircraft during the first portion of said launching, said delay means comprising a reset type switch connected in series with said switching means, a time delay relay connected to operate said reset switch after said time delay relay is energized for said predetermined time interval, and energizing means for said time delay relay comprising an energizing switch in said aircraft and circuit means partially in said aircraft and partially in said launching device connected to throw said energizing switch to an energizing position simultaneously with the first motion of said launching device, said energizing switch being adapted to remain in said energizing position after said aircraft has separated from said launching device, whereby said predetermined time interval can be as long as desired.

References Cited in the file of this patent

UNITED STATES PATENTS

| | | |
|---|---|---|
| 2,483,594 | Oliver | Oct. 4, 1949 |
| 2,489,248 | Abraham | Nov. 29, 1949 |
| 2,561,363 | Haeff | July 24, 1951 |
| 2,603,433 | Nosker | July 15, 1952 |